(12) United States Patent
Fabjański

(10) Patent No.: US 11,847,232 B2
(45) Date of Patent: Dec. 19, 2023

(54) SECURE CLOUD PROCESSING

(71) Applicant: ASSA ABLOY AB, Stockholm (SE)

(72) Inventor: Krzysztof Grzegorz Fabjański, Bielsko-Biala (PL)

(73) Assignee: ASSA ABLOY AB, Stockholm (SE)

( * ) Notice: Subject to any disclaimer, the term of this patent is extended or adjusted under 35 U.S.C. 154(b) by 506 days.

(21) Appl. No.: 17/152,569

(22) Filed: Jan. 19, 2021

(65) Prior Publication Data
US 2022/0229914 A1    Jul. 21, 2022

(51) Int. Cl.
G06F 9/455    (2018.01)
G06F 21/60    (2013.01)
G06F 21/45    (2013.01)
H04L 9/40     (2022.01)

(52) U.S. Cl.
CPC ........ G06F 21/602 (2013.01); G06F 9/45558 (2013.01); G06F 21/45 (2013.01); H04L 63/0442 (2013.01); H04L 63/102 (2013.01); G06F 2009/45562 (2013.01)

(58) Field of Classification Search
CPC .................................................. G06F 9/45558
See application file for complete search history.

(56) References Cited

U.S. PATENT DOCUMENTS

2011/0296201 A1* 12/2011 Monclus ............... G06F 21/53
                                                    718/1
2018/0302495 A1  10/2018 Lee et al.

FOREIGN PATENT DOCUMENTS

CN    108021801 A1 *  5/2018  ............ G06F 21/42
EP    3483760       5/2019
KR    20170108667   9/2017

OTHER PUBLICATIONS

"European Application Serial No. 22152007.5, Extended European Search Report dated Jun. 1, 2022", 9 pgs.
"European Application Serial No. 22152007.5, Response filed Jan. 19, 2023 to Extended European Search Report dated Jun. 1, 2022", 14 pages.

* cited by examiner

*Primary Examiner* — Charlie Sun
(74) *Attorney, Agent, or Firm* — Schwegman Lundberg & Woessner, P.A.

(57) ABSTRACT

Methods and systems are provided for performing operations comprising: generating, on a publicly accessible server, a secure enclave, the secure enclave having isolated memory and processing resources of the server; installing, on the secure enclave, a virtual machine comprising a guest operating system of a first entity; installing, by the virtual machine, one or more cryptographic processes associated with the first entity; and encrypting and decrypting cryptographic keys associated with the first entity using the one or more cryptographic processes.

20 Claims, 7 Drawing Sheets

SECURE CLOUD PROCESSING

BACKGROUND

Electronic credentials are increasingly being hosted in smart devices (e.g., smart phones, smart watches, and various other Internet-connected devices) and have become commonplace. Such electronic credentials are used, for example, to unlock electronic smart door locks (used in hotels, enterprises), present digital identifiers of users (e.g., digital driver's licenses), and to present electronic tickets for entering ticketed events (e.g., concerts, sporting events, and so forth).

SUMMARY

In some aspects, a method is provided comprising: generating, on a publicly accessible server, a secure enclave, the secure enclave having isolated memory and processing resources of the server; installing, on the secure enclave, a virtual machine comprising a guest operating system of a first entity; installing, by the virtual machine on the guest operating system, one or more cryptographic processes associated with the first entity; and encrypting and decrypting cryptographic keys associated with the first entity using the one or more cryptographic processes.

In some aspects, the publicly accessible server is configured to execute multiple processes for a plurality of entities, the isolated memory and processing resources of the server are exclusively reserved for processes associated with the first entity, and the memory and processing resources are isolated from other memory and processing resources of the server that are used for executing the multiple processes for the plurality of entities.

In some aspects, the method includes executing, by the virtual machine, one or more serverless functions.

In some aspects, the one or more serverless functions comprise Lambda functions.

In some aspects, the virtual machine runs a host operating system comprising the guest operating system, and the host operating system runs an executable functional code block comprising the one or more cryptographic processes or serverless functions.

In some aspects, the method includes establishing, by a client device, a communication session with the publicly accessible server via a TCP interface; and receiving, from the client device through the communication session, a message directed to the host operating system via a public-key cryptography standard (PKCS) #11 interface, the message comprising a request to encrypt or decrypt data using the cryptographic keys.

In some aspects, the message is received from the client device via the Internet.

In some aspects, the method includes generating, by the executable image file, one or more credentials in response to receiving the message; and transmitting the one or more credentials to the client device via the PKCS #11 interface.

In some aspects, the client device is configured to obtain access to a secure resource protected by one or more physical or logical access devices based on the one or more credentials.

In some aspects, the one or more cryptographic processes are proprietary to the first entity.

In some aspects, a system is provided comprising: one or more processors configured to perform operations comprising: generating, on a publicly accessible server, a secure enclave, the secure enclave having isolated memory and processing resources of the server; installing, on the secure enclave, a virtual machine comprising a guest operating system of a first entity; installing, by the virtual machine on the guest operating system, one or more cryptographic processes associated with the first entity; and encrypting and decrypting cryptographic keys associated with the first entity using the one or more cryptographic processes.

In some aspects, the publicly accessible server is configured to execute multiple processes for a plurality of entities, the isolated memory and processing resources of the server are exclusively reserved for processes associated with the first entity, and the memory and processing resources are isolated from other memory and processing resources of the server that are used for executing the multiple processes for the plurality of entities.

In some aspects, the operations include executing, by the virtual machine, one or more serverless functions.

In some aspects, the one or more serverless functions comprise Lambda functions.

In some aspects, the virtual machine runs a host operating system comprising the guest operating system, and the host operating system runs an executable functional code block comprising the one or more cryptographic processes.

In some aspects, the operations include establishing, by a client device, a communication session with the publicly accessible server via a TCP interface; and receiving, from the client device through the communication session, a message directed to the host operating system via a public-key cryptography standard (PKCS) #11 interface, the message comprising a request to encrypt or decrypt data using the cryptographic keys.

In some aspects, the message is received from the client device via the Internet.

In some aspects, the operations include generating, by the executable image file, one or more credentials in response to receiving the message; and transmitting the one or more credentials to the client device via the PKCS #11 interface.

In some aspects, the client device is configured to obtain access to a secure resource protected by one or more physical or logical access devices based on the one or more credentials.

In some aspects, a non-transitory computer-readable medium is provided comprising non-transitory computer-readable instructions that includes: generating, on a publicly accessible server, a secure enclave, the secure enclave having isolated memory and processing resources of the server; installing, on the secure enclave, a virtual machine comprising a guest operating system of a first entity; installing, by the virtual machine on the guest operating system, one or more cryptographic processes associated with the first entity; and encrypting and decrypting cryptographic keys associated with the first entity using the one or more cryptographic processes.

DETAILED DESCRIPTION

Figure 1:
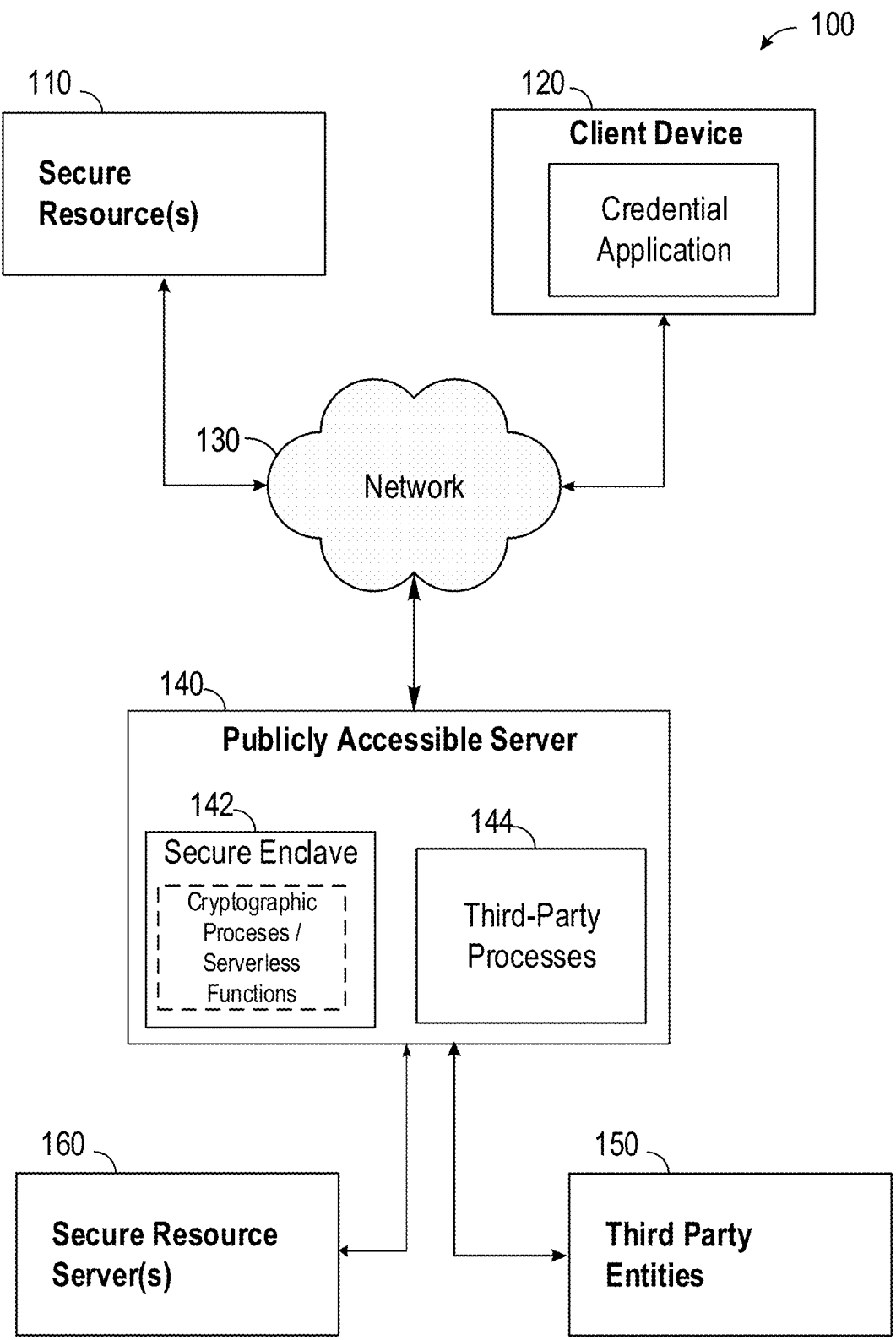
FIG. 1 is a block diagram of an example cloud-based credential system, according to some embodiments.

Example methods and systems for a cloud-based credential system are described. In the following description, for purposes of explanation, numerous specific details are set forth in order to provide a thorough understanding of example embodiments. It will be evident, however, to one of ordinary skill in the art that embodiments of the disclosure may be practiced without these specific details.

In typical card-based physical access control systems, a user carries a physical card or device that contains a set of credentials (e.g., authorization information). Such credentials are exchanged with a physical access device (e.g., an electronic door lock) when the physical card or device is brought within about 20 centimeters (close proximity) to the physical access device. At that point, the physical access device determines if the credentials authorize the user to access the physical access device and, if so, the physical access device grants access (e.g., opens the door lock).

As mobile devices become more commonplace, such mobile devices can be programmed to carry the same set of credentials as the physical cards that are typically used and to perform transactions with the physical access devices. These mobile devices need trust when they perform these transactions using their digital identity on the devices. A customer system which intends to install such identities on mobile devices needs to support different proprietary credential technologies and needs to consider the hardware or software security schemes available to store such identities (e.g., embedded secure element (eSE) or secure element, trusted execution environment (TEE), device memory, etc.). Delivering and managing storage of the credentials on the hardware or secure software interfaces of the mobile devices can be challenging and expensive. Because of this, there is a growing interest in offloading such security management protocols to cloud-based systems. As referred to herein, cloud-based systems include private cloud systems (where customers pay only for what they have used), private cloud systems (where customers pay for the hardware and maintenance), and/or combination of the two as a hybrid system. Allowing access and control over the secure credentials on cloud-based systems increases the versatility and efficiency at which secure credentials are exchanged. However, cloud-based systems are typically shared by multiple different companies and entities. As such, storing and managing credentials on cloud-based systems introduces risks of such data being compromised. Specifically, because different entities share processing and memory resources of the cloud-based systems, it is within the realm of possibility that some secure information will remain stored in the memory of the cloud-based systems long after the secure information is used by one entity and can be exposed to other entities who share the memory resources.

Some cloud-based systems provide for the ability to manage secure information on the Internet by dedicating storage and processing resources of the cloud-based systems to certain entities. However, such dedicated storage and processing resources are limited in their processing abilities to generic cryptographic operations which are incompatible with the security protocols of certain secure credentials. For example, a key management server (KMS) has limitations in the number of operations that are allowed to be performed and much more limitations on the type of cryptographic algorithms supported by the service. As such, while having dedicated and isolated storage and processing resources decreases the risk of exposure of secure information, such processing resources still cannot be used to perform cryptographic operations needed to manage distribution and maintenance of secure credentials. Certain more secure cloud-based solutions, such as CloudHSM, enhance the level of security but are prohibitively expensive to use in general applications.

The disclosed embodiments provide an intelligent cloud-based solution for managing storage and delivery of digital credentials in accordance with specifications (e.g., the cryptographic operations and protocols) of a given secure resource. Specifically, according to the disclosed embodiments a secure enclave is generated on a publicly accessible server. The secure enclave has isolated memory and processing resources of the server. The disclosed embodiments install, on the secure enclave, a virtual machine comprising a guest operating system of a first entity and install, by the virtual machine, one or more cryptographic processes associated with the first entity and/or one or more serverless functions. The disclosed embodiments include encrypting and decrypting cryptographic keys associated with the first entity using the one or more cryptographic processes to issue and manage storage and distribution of secure credentials. In some cases, an additional virtualization layer is installed on the guest operating system and the one or more cryptographic processes and/or serverless functions are installed on this additional virtualization layer.

In this way, a cloud-based server system (e.g., a publicly accessible server) can accept requests from any other external system including a mobile or wearable device manufacturer's system and manage and issue digital credentials in a secure manner. The cloud-based server system accepts requests to provision the digital credentials, provisions or transmits the digital credentials securely to the smart device (e.g., mobile phones, smart phones, wearables, smart watches, or fitness watches) and also enables a mechanism in the cloud-based server system to be safely stored and presented to various secure resources (e.g., Internet-of-Things (IoT) devices, physical access control devices, logical access control devices, governmental entities, residential smart locks and many other Bluetooth or NFC- or UWB-based smart devices).

FIG. 1 is a block diagram showing an example cloud-based credential system 100 (e.g., cloud-based credential management and distribution system), according to various example embodiments. The cloud-based credential system 100 can include a client device 120, one or more secure resource(s) 110 that control access to a protected physical or logical asset or resource, such as through a lockable door, a publicly accessible server 140, one or more secure resource server(s) 160, and one or more third-party entities 150 that are communicatively coupled over a network 130 (e.g., Internet, BLE, ultra-wideband (UWB) communication protocol, telephony network).

The client device 120 and the secure resource(s) 110 can be communicatively coupled via electronic messages (e.g., packets exchanged over the Internet, BLE, UWB, WiFi direct or any other protocol). In some implementations, any communication between devices (e.g., client device 120 and secure resource 110 and/or server 140) is exchanged in encrypted form, such as in accordance with a transport layer security (TLS) protocol and/or a secure socket layer (SSL) protocol. While FIG. 1 illustrates a single secure resource(s) 110 and a single client device 120, it is understood that a plurality of secure resources 110 and a plurality of client devices 120 can be included in the cloud-based credential system 100 in other embodiments. As used herein, the term "client device" may refer to any machine that interfaces to a communications network (such as network 130) to exchange credentials with a secure resource(s) 110, the publicly accessible server 140, another client device 120 or any other component to obtain access to the asset or resource protected by the secure resource(s) 110.

The secure resource(s) 110 can include any one or a combination of an IoT device, physical access control device, logical access control device, governmental entity device, ticketing event device, and residential smart lock and/or other Bluetooth, NFC or UWB based smart device. For example, the secure resource 110 can protect a secure area and can be configured to receive a digital credential or digital credentials from the client device 120. The secure resource 110 can verify that the received digital credential is authorized to access the secure area and, in response, the secure resource 110 can grant access to the secure area. In some embodiments, the client device 120 communicates the identity of the secure resource 110 and the digital credentials to the publicly accessible server 140 (e.g., a secure enclave 142) and/or to the secure resource server 160. The secure enclave 142 of the publicly accessible server 140 and/or the secure resource server 160 can verify whether the digital credentials are authorized to access the identified secure resource. For example, the secure enclave 142 can perform one or more cryptographic processes on the digital credentials to decrypt the credentials and determine whether such credentials match previously stored credentials on the secure enclave 142. If so, the secure enclave 142 of the publicly accessible server 140 and/or the secure resource server 160 can instruct the secure resource 110 to grant access to the client device 120 (e.g., by unlocking an electronic door lock). In this case, the digital credentials are passed from the client device 120 to the secure enclave 142 on the publicly accessible server 140 and/or to the secure resource server 160 rather than to the secure resource 110.

A client device 120 may be, but is not limited to, a mobile phone, desktop computer, laptop, portable digital assistant (PDA), smart phone, a wearable device (e.g., a smart watch), tablet, ultrabook, netbook, laptop, multi-processor system, microprocessor-based or programmable consumer electronics, or any other communication device that a user may use to access the network 130.

The secure resource 110 can include a physical or logical access control device that can include an access reader device connected to a physical resource (e.g., a door locking mechanism or backend server) that controls the physical resource (e.g., door locking mechanism). The physical resource associated with the physical access control device can include a door lock, an ignition system for a vehicle, or any other device that grants or denies access to a physical component and that can be operated to grant or deny access to the physical component. For example, in the case of a door lock, the physical access control device can deny access, in which case the door lock remains locked and the door cannot be opened, or can grant access, in which case the door lock becomes unlocked to allow the door to be opened. As another example, in the case of an ignition system, the physical access control device can deny access, in which case the vehicle ignition system remains disabled and the vehicle cannot be started, or can grant access, in which case the vehicle ignition becomes enabled to allow the vehicle to be started. Any discussion with respect to physical access control devices similarly applies to logical access control devices.

Physical access control covers a range of systems and methods to govern access, for example by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. The physical access control device forms part of physical access control systems (PACS), which can include a reader (e.g., an online or offline reader) that holds authorization data and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or PACS can include a host server to which readers and actuators are connected (e.g., via a controller) in a centrally managed configuration. In centrally managed configurations, readers can obtain credentials from credential or key devices and pass those credentials to the PACS host server. The host server then determines whether the credentials authorize access to the secure area or secure asset and commands the actuator or other control mechanism accordingly.

In general, the secure resource 110 can include one or more of a memory, a processor, one or more antennas, a communication module, a network interface device, a user interface, and a power source or supply.

The memory of the secure resource 110 can be used in connection with the execution of application programming or instructions by the processor of the secure resource 110, and for the temporary or long-term storage of program instructions or instruction sets and/or credential or authorization data, such as credential data, credential authorization data, or access control data or instructions. For example, the memory can contain executable instructions that are used by the processor to run other components of secure resource 110 and/or to make access determinations based on credential or authorization data. The memory of the secure resource 110 can comprise a computer-readable medium that can be any medium that can contain, store, communicate, or transport data, program code, or instructions for use by or in connection with secure resource 110. The computer-readable medium can be, for example but is not limited to, an electronic, magnetic, optical, electromagnetic, infrared, or semiconductor system, apparatus, or device. More specific examples of suitable computer-readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processor of the secure resource 110 can correspond to one or more computer processing devices or resources.

For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor can be provided as a microprocessor, Central Processing Unit (CPU), or plurality of microprocessors or CPUs that are configured to execute instructions sets stored in an internal memory and/or memory of the secure resource 110.

The antenna of the secure resource 110 can correspond to one or multiple antennas and can be configured to provide for wireless communications between secure resource 110 and a credential or key device (e.g., client device 120). The antenna can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, the antenna(s) can be RF antenna(s), and as such, may transmit/receive RF signals through free-space to be received/transferred by a credential or key device having an RF transceiver. In some cases, at least one antenna is an antenna designed or configured for transmitting and/or receiving UWB signals (referred to herein for simplicity as a "UWB antenna") such that the reader can communicate using UWB techniques with the client device 120.

A communication module of the secure resource 110 can be configured to communicate according to any suitable communications protocol with one or more different systems or devices either remote or local to secure resource 110, such as one or more client devices 120 and/or publicly accessible server 140.

The network interface device of the secure resource 110 includes hardware to facilitate communications with other devices, such as a one or more client devices 120 and/or publicly accessible server 140, over a communication network, such as network 130, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, the network interface device can include an Ethernet port or other physical jack, a Wi-Fi card, a Network Interface Card (NIC), a cellular interface (e.g., antenna, filters, and associated circuitry), or the like. In some examples, the network interface device can include a plurality of antennas to wirelessly communicate using at least one of single-input multiple-output (SIMO), multiple-input multiple-output (MIMO), or multiple-input single-output (MISO) techniques.

A user interface of the secure resource 110 can include one or more input devices and/or display devices. Examples of suitable user input devices that can be included in the user interface include, without limitation, one or more buttons, a keyboard, a mouse, a touch-sensitive surface, a stylus, a camera, a microphone, etc. Examples of suitable user output devices that can be included in the user interface include, without limitation, one or more LEDs, an LCD panel, a display screen, a touchscreen, one or more lights, a speaker, and so forth. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a LAN, a wireless network, a wireless LAN (WLAN), a wide area network (WAN), a wireless WAN (WWAN), a metropolitan area network (MAN), BLE, UWB, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short range or long range protocols, or other data transfer technology.

Figure 6:
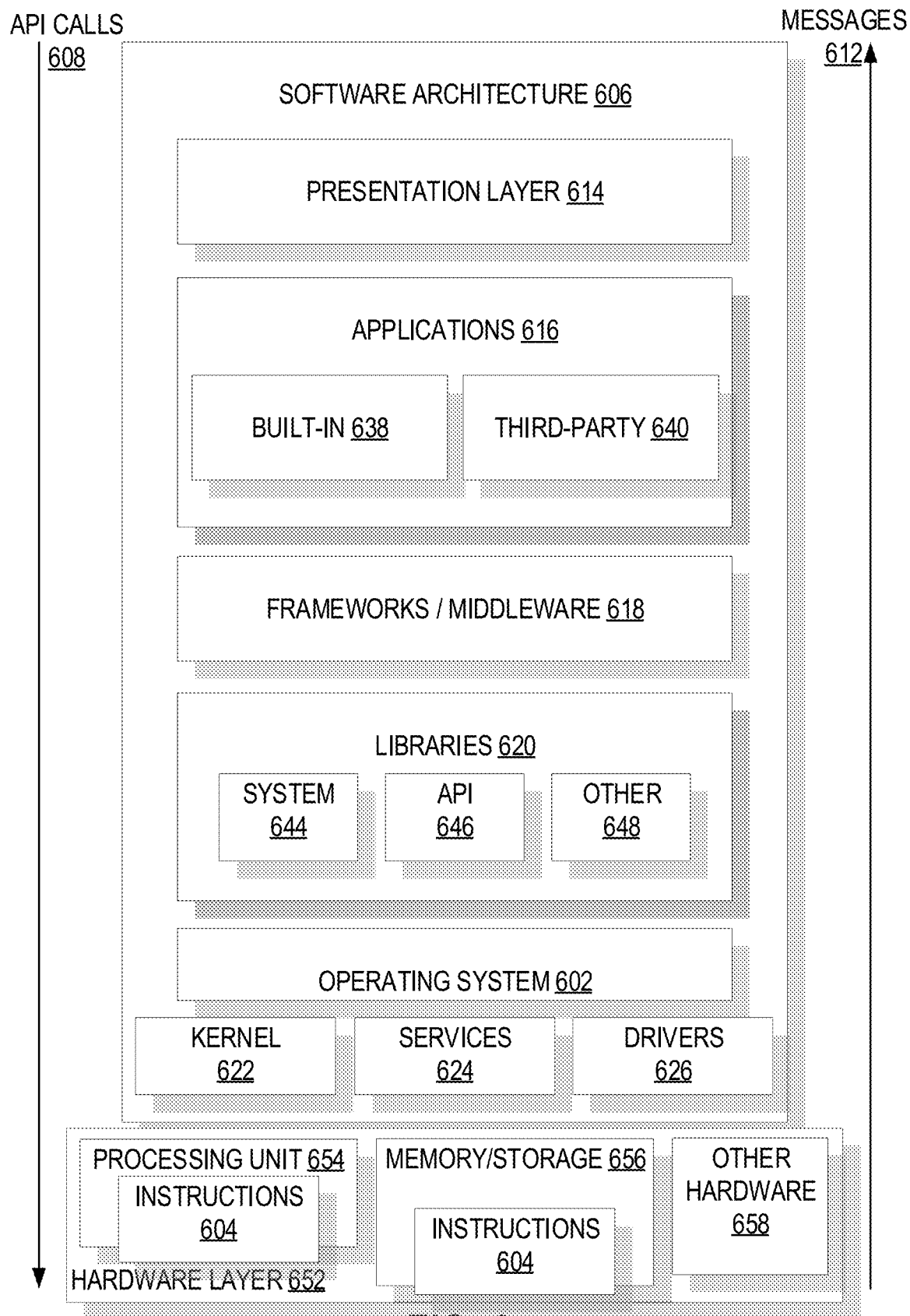
FIG. 6 is a block diagram illustrating an example software architecture, which may be used in conjunction with various hardware architectures herein described.
Figure 7:
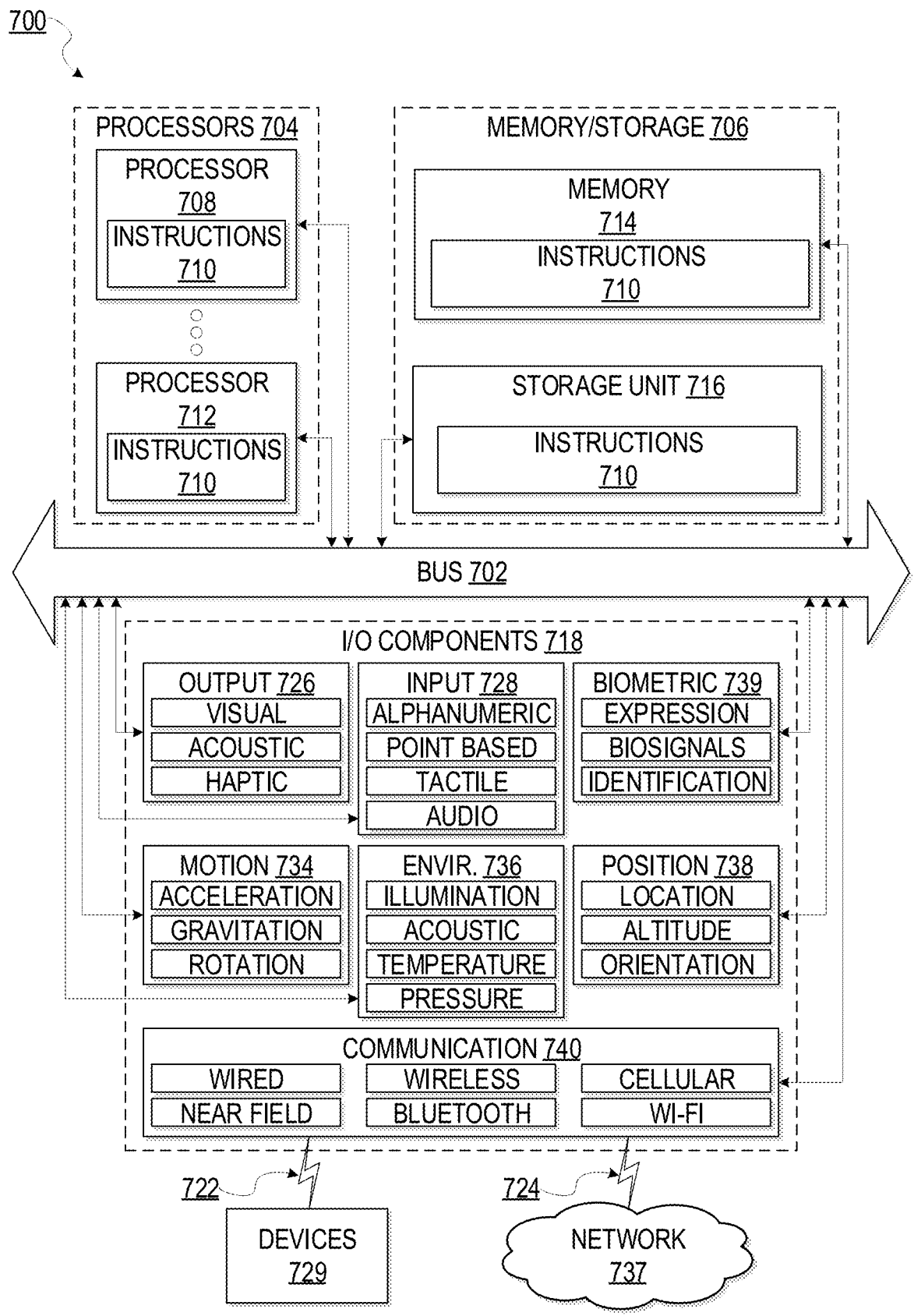
FIG. 7 is a block diagram illustrating components of a machine, according to some example embodiments.

The publicly accessible server 140 can include elements described with respect to FIGS. 6 and 7, such as a processor and memory, having instructions stored thereon, that when executed by the processor, causes the processor to control the functions of the publicly accessible server 140.

The publicly accessible server 140 can provide one or more secure enclaves 142. Each secure enclave 142 comprises dedicated isolated processing and memory resources of the publicly accessible server 140 on a host device. Specifically, the secure enclave 142 can use processing and memory resources of a computing device of the publicly accessible server 140 that are separate, independent and isolated from other third-party processes 144 that are running on the publicly accessible server 140. For example, the publicly accessible server 140 can be a general purpose computer that is accessible to many different entities (e.g., third-party entities 150) and users. In general, each entity and user can communicate with the server over a TCP connection or session and request that the server perform certain functions (e.g., third-party processes 144). These functions are generally performed using the same set of processors and shared memory resources of the publicly accessible server 140. By generating and creating a secure enclave 142, a specific set of processors and specific segment of memory is allocated to a given entity. That specific set of processors and segment of memory is only accessible and visible to the given entity through another secure interface, such as a public-key cryptography standard (PKCS) #11 interface (or other suitable secure interface).

Figure 2:
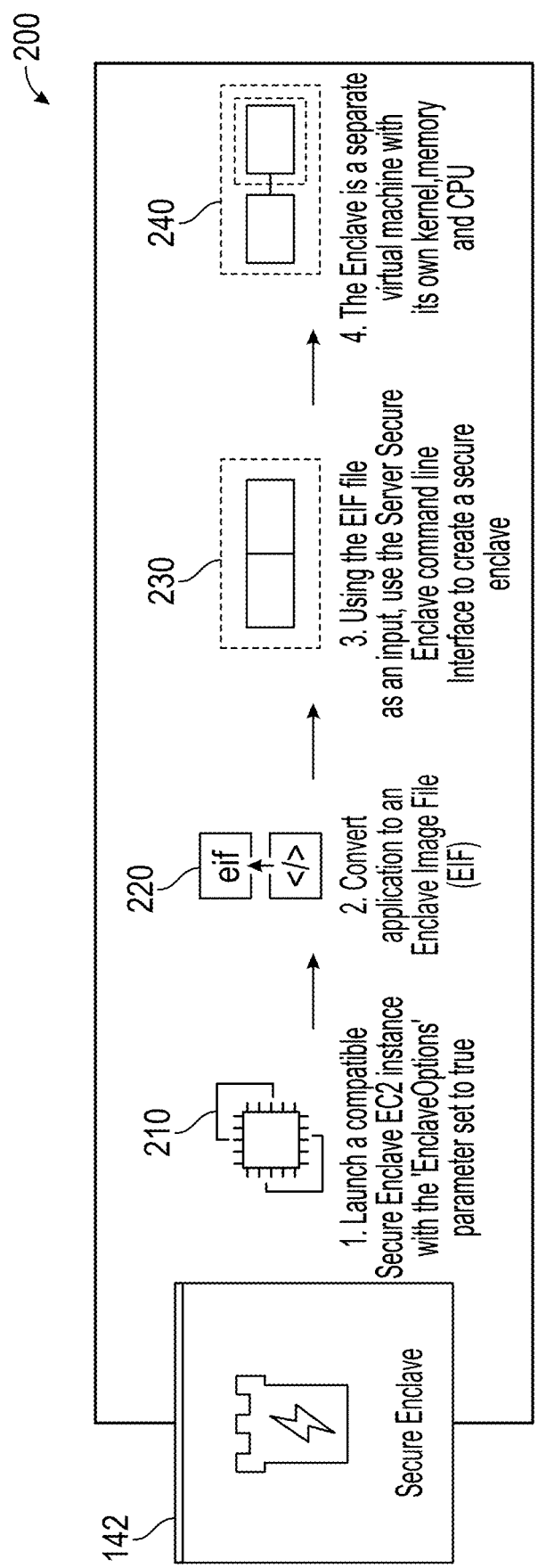
FIG. 2 illustrates an example process for establishing a secure enclave, according to exemplary embodiments.

FIG. 2 illustrates an example process 200 for establishing a secure enclave 142, according to exemplary embodiments. Specifically, a given entity (e.g., a manufacturer, owner, operators, and/or manager of a given secure resource 110) can be assigned a secure enclave 142. To do so, the given entity performs an operation 210 to access the publicly accessible server 140 and launches a computing server (e.g., an elastic computing EC2 or virtual server) instance with the enclave options parameter set to true. The given entity provides a virtual machine application (e.g., a guest operating system) to the publicly accessible server 140 via a TCP connection. The publicly accessible server 140 performs operation 220 to convert the application to an enclave image file (EIF). The publicly accessible server 140 performs operation 230 to use the EIF file as an input, and based on a server secure enclave command line interface, the publicly accessible server 140 creates the secure enclave 142 for the given entity. A set of secure credentials are exchanged between the publicly accessible server 140 and the given entity that allow the given entity communicate with the secure enclave 142 over the PKCS #11 interface. Then, at operation 240, the publicly accessible server 140 generates the secure enclave 142 based on the established credentials that is separate from other processes that run on the publicly accessible server 140 with an isolated set of kernel, memory and processing resources.

Figure 3:
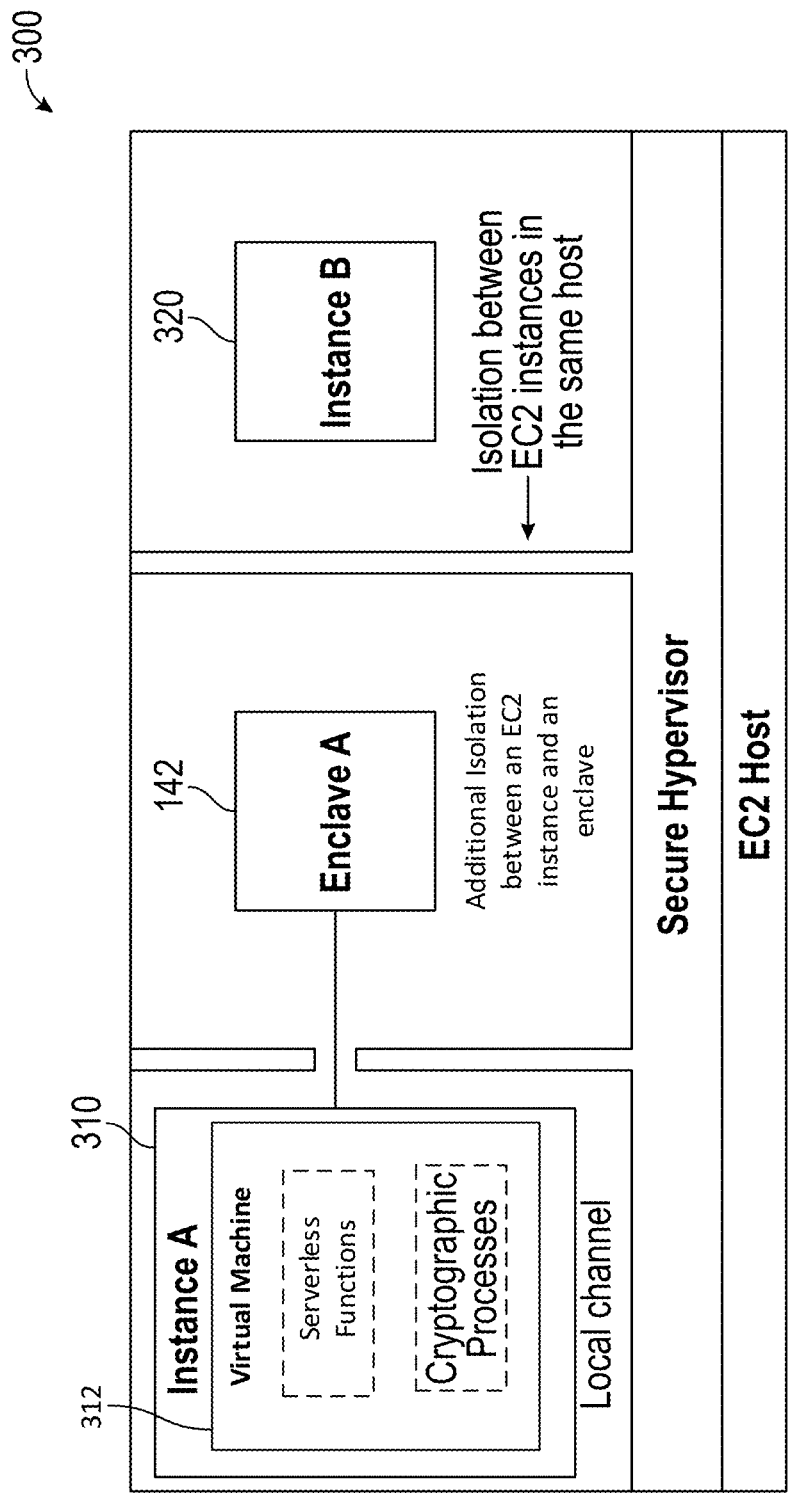
FIG. 3 is a block diagram of a secure enclave implemented on a host server, according to some embodiments.
Figure 4:
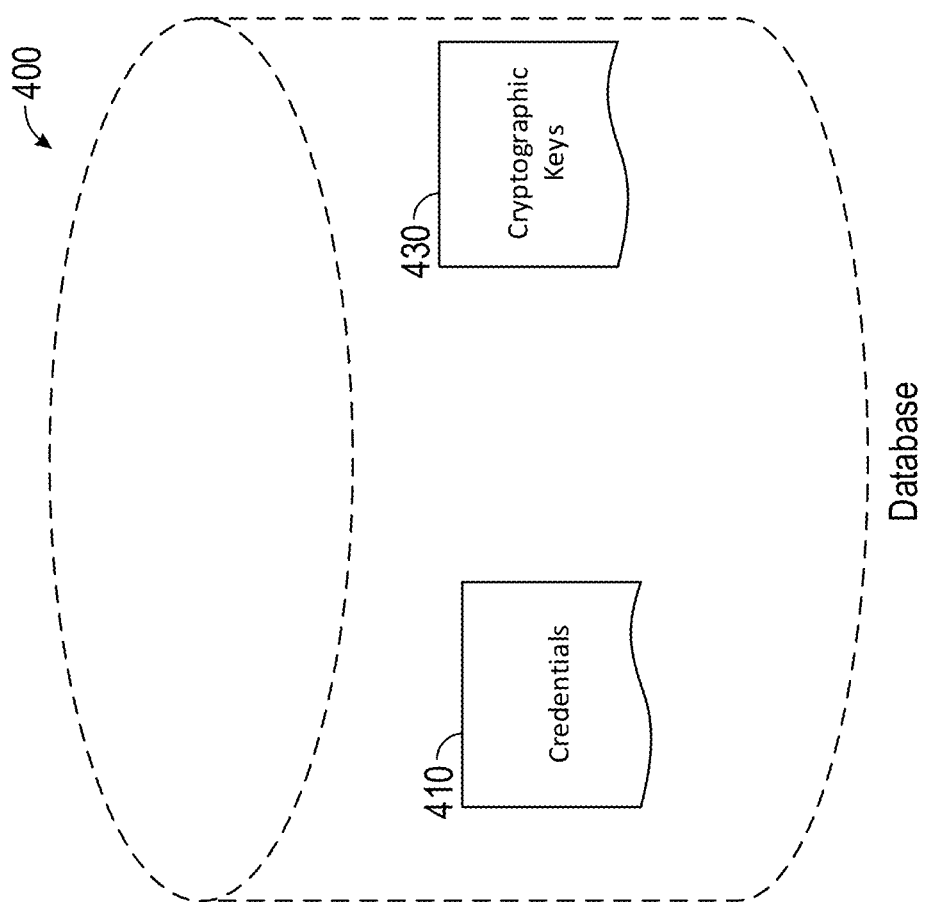
FIG. 4 is an example database that may be deployed within the system of FIG. 1, according to some embodiments.

FIG. 3 illustrates an example instance 300 of the secure enclave 142 on a host running on the publicly accessible server 140. Specifically, a secure hypervisor generates an instance A 310 that runs a virtual machine application 312 provided by the given entity. The virtual machine application 312 runs a physical computer system or virtual machine running a host operating system (e.g., a docker host or another hypervisor) that runs an executable file (or a functional code block) compatible with the operating system being run by the virtual machine (e.g., a docker image or guest image). The executable file (or a functional code block) can include one or more cryptographic processes that store and manage a set of secure credentials of a secure resource associated with the given entity. For example, the executable file (or a functional code block) can store a database 400 (FIG. 4) that includes credentials 410 for accessing one or more secure resources 110 of the given entity by one or more client devices 120. The database 400 can also store one or more cryptographic keys 430 for managing access to the credentials 410 (e.g., for encrypting and decrypting communications of the credentials 410 by and between client device 120, secure resources 110, and/or the secure enclave 142). In some cases, the executable file (or a functional code block) also or alternatively runs serverless functions (e.g., Lambda functions or programming language-agnostic functions).

As shown in instance 300, another instance B 320 that is associated with the third-party entities 150 (e.g., that runs third-party processes 144) is entirely isolated from the instance A 310. In this way, none of the kernel, memory and processing resources of the instance A 310 are visible to or shared by the third-party processes 144.

Referring back to FIG. 1, in one example, the client device 120 provides the credentials directly to the secure resource 110. In such cases, the secure resource 110 communicates the credentials to the secure enclave 142 on the publicly accessible server 140 associated with the entity that provides the secure resource 110. Specifically, each manufacturer, owner, operator, or manager of a given secure resource 110 can establish its own secure enclave 142 on the publicly accessible server 140. The secure enclave 142 can execute one or more cryptographic processes that are, for example, proprietary to the respective manufacturers of the secure resources 110. The one or more cryptographic processes are used to securely store and manage credentials associated with the device manufacturer and to securely distribute new credentials to requesting client devices 120. In some cases, the secure enclave 142 can be used to execute one or more serverless processes (e.g., Lambda functions).

In one example, the secure enclave 142 receives the credentials from the client device 120 over a public-key cryptography standard (PKCS) #11 interface (or other suitable secure interface). The PKCS #11 interface ensures that any communication or messages exchanged between the publicly accessible server 140 and secure resources 110 and 120 are secured. Specifically, the client device 120 can establish a typical TCP communication session with the publicly accessible server 140 and then can transmit messages to the secure enclave 142 over the PKCS #11 interface. Such messages are encrypted in a manner that only the secure enclave 142 can decrypt the messages. The secure enclave 142 then searches a list of credentials stored in the secure enclave 142 to determine whether the received credentials match credentials from the list of authorized credentials for accessing a secure asset or resource (e.g., door or secure area) protected by the secure resource 110. In response to determining that the received credentials are authorized to access the secure resource 110, the secure enclave 142 instructs the secure resource 110 to perform an operation granting access for the client device 120 (e.g., instructing the secure resource 110 to unlock a lock of a door). For example, the secure enclave 142 can communicate with the secure resource 110 via the Internet and through the publicly accessible server 140 over the PKCS #11 interface, or any other suitable secure interface.

In some embodiments, the client device 120 implements a credential application. The credential application may run on the client device 120 and can be accessed by a user of the client device 120. The credential application can access multiple digital credentials that are associated with the client device 120 and that are stored on the secure enclave 142. For example, the secure enclave 142 can include a digital credentials wallet that is accessible via the Internet and through the PKCS #11 interface by the credential application of the client device 120. The credential application can present a user interface to the user that lists all the digital credentials stored and maintained by the secure enclave 142. In response to receiving input from the user that selects a given digital credential from the user interface, the credential application performs operations to retrieve the associated digital credentials from the secure enclave 142 via the PKCS #11 interface. In this way, rather than storing the digital credentials in a secure element portion of the client device 120 (or in the TEE of the client device 120), the digital credentials can be managed and stored on a publicly accessible server (on the cloud) in the secure enclave 142.

Upon retrieval and/or decrypting of the digital credentials, the credential application can present the digital credentials on a screen of the client device 120 (e.g., the credential application can display a barcode corresponding to an electronic ticket, a picture of the user associated with the digital credential, such as a digital ID, and so forth). In some cases, the retrieved digital credentials are used to access a secure resource 110. In such circumstances, the credential application transmits the obtained credentials to the secure resource 110 to obtain access to the resource protected by the secure resource 110.

The credential application is configured to allow a user to add a new digital credential. For example, the credential application presents an on-screen option to add a new digital credential. In response to receiving selection of the option to add the new digital credential, the credential application obtains identifying information of the secure resource 110 associated with the new digital credential. The credential application transmits the request to add the new digital credential to the secure enclave 142 on the publicly accessible server 140 along with the identifying information of the secure resource 110.

The secure enclave 142 of the publicly accessible server 140 retrieves an identifier of the server associated with the identified secure resource 110 from the storage associated with the secure enclave 142. The secure enclave 142 communicates via the PKCS #11 interface (or other secure interface) with the secure resource server 160 to obtain the requested new digital credential associated with the secure resource 110 identified by the credential application running on the client device 120. The secure enclave 142 sends to the secure resource server 160 information associated with the user of the client device 120 and information associated with the secure resource 110 (e.g., a unique address or unique serial number of the secure resource 110) over the secure PKCS #11 connection. The secure resource server 160 generates a digital credential for accessing the identified secure resource 110 and stores the digital credential on the secure enclave 142 by sending the digital credential over the PKCS #11 connection. The secure enclave 142 sends a confirmation message to the credential application on the client device 120 after the new digital credential has been generated and stored.

Figure 5:
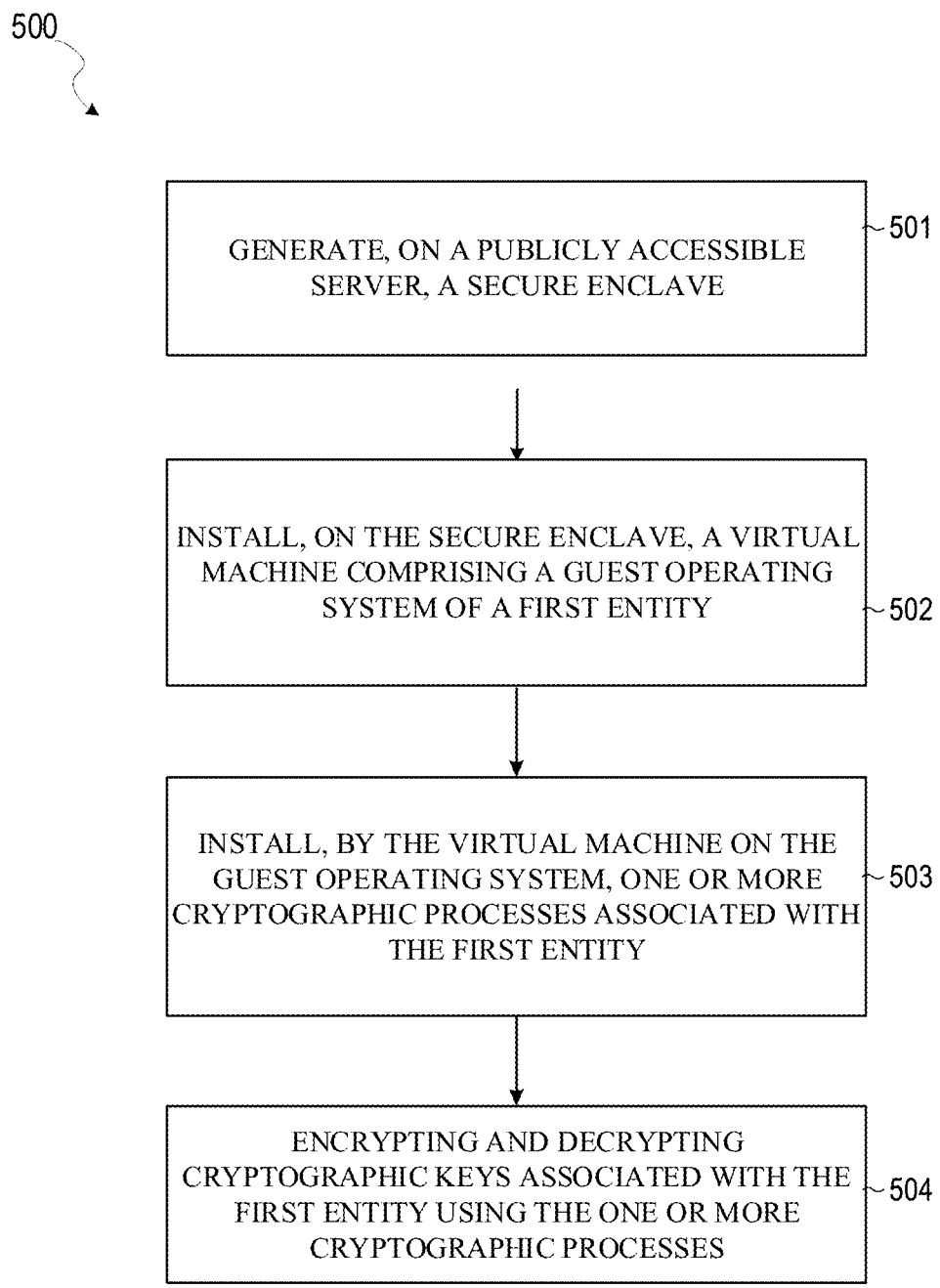
FIG. 5 is a flowchart illustrating example operations of the cloud-based credential system, according to example embodiments.

FIG. 5 is a flowchart illustrating example process 500 of the cloud-based credential system 100, according to example embodiments. The process 500 may be embodied in computer-readable instructions for execution by one or more processors such that the operations of the process 500 may be performed in part or in whole by the functional components of the cloud-based credential system 100; accordingly, the process 500 is described below by way of example with reference thereto. However, in other embodiments, at least some of the operations of the process 500 may be deployed on various other hardware configurations. Some or all of the operations of process 500 can be in parallel, out of order, or entirely omitted.

At operation 501, the cloud-based credential system 100 generates, on a publicly accessible server, a secure enclave, the secure enclave having isolated memory and processing resources of the server. For example, the cloud-based credential system 100 generates a secure enclave 142 through the processes discussed in connection with FIG. 2 above.

At operation 502, the cloud-based credential system 100 installs, on the secure enclave, a virtual machine comprising a guest operating system of a first entity. For example, the cloud-based credential system 100 receives a virtual machine (e.g., a guest operating system) from a given entity (e.g., a manufacturer or provider of a secure resource 110). The virtual machine is converted to a file that runs on the secure enclave 142.

At operation 503, the cloud-based credential system 100 installs, by the virtual machine on the guest operating system, one or more cryptographic processes associated with the first entity and/or a container (e.g., an additional virtual machine or serverless function). The given entity communicates with the virtual machine to provide one or more cryptographic processes, such as proprietary cryptographic engines for encrypting and decrypting credentials for accessing the secure resource 110. In an example, the given entity establishes a connection to the publicly accessible server 140 over the Internet and a TCP connection. Then, the given entity sends messages comprising installation files for the one or more cryptographic processes via a secure protocol, such as PKCS #11 interface. These installation files allow the virtual machine to execute the processes associated with the proprietary cryptographic engines. In some cases, the one or more cryptographic processes are implemented and installed on an additional virtualization layer (e.g., another docker image that includes a virtual machine). Namely, a first virtual machine can be installed on the guest operating system and a second virtual machine can be installed on the first virtual machine. Each virtual machine can run its own operating system. The one or more cryptographic processes and/or serverless functions can be installed on the second virtual machine.

At operation 504, the secure enclave 142 of the cloud-based credential system 100 encrypts and decrypts cryptographic keys associated with the first entity using the one or more cryptographic processes. The proprietary cryptographic engines running on the virtual machine within the secure enclave 142 store, manage and distribute secure credentials between the client devices 120, the secure resources 110 and the secure resource servers 160 using the stored cryptographic keys.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage devices memory/storage 656, which also have executable instructions 604. The hardware layer 652 may also comprise other hardware 658. The software architecture 606 may be deployed in any one or more of the components shown in FIG. 1.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, BLE drivers, UWB drivers, Bluetooth drivers, flash memory drivers, serial communication drivers (e.g., Universal Serial Bus (USB) drivers), Wi-Fi drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/devices.

The frameworks/middleware 618 (also sometimes referred to as middleware) provide a higher-level common infrastructure that may be used by the applications 616 and/or other software components/devices. For example, the frameworks/middleware 618 may provide various graphic user interface functions, high-level resource management, high-level location services, and so forth. The frameworks/middleware 618 may provide a broad spectrum of other APIs that may be utilized by the applications 616 and/or other software components/devices, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed.

As such, the instructions 710 may be used to implement devices or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory/storage 706 may include a memory 714, such as a main memory, or other memory storage, instructions 710, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), a camera that can detect and decode QR codes or perform facial recognition, and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 729 may be another machine or any of a wide variety of peripheral devices (e.g., a peripheral device coupled via a USB).

Moreover, the communication components 740 may detect identifiers or include components operable to detect identifiers. For example, the communication components 740 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultrabook, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a VPN, a LAN, a BLE network, a UWB network, a WLAN, a WAN, a WWAN, a metropolitan area network (MAN), the Internet, a portion of the Internet, a portion of the PSTN, a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), 5G networks, High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
   generating, on a publicly accessible server, a secure enclave, the secure enclave having isolated memory and processing resources of the server;
   installing, on the secure enclave, a virtual machine comprising a guest operating system of a first entity;
   installing, by the virtual machine on the guest operating system, one or more cryptographic processes associated with the first entity; and
   encrypting and decrypting cryptographic keys associated with the first entity using the one or more cryptographic processes.

2. The method of claim 1, wherein the publicly accessible server is configured to execute multiple processes for a plurality of entities, wherein the isolated memory and processing resources of the server are exclusively reserved for processes associated with the first entity, and wherein the memory and processing resources are isolated from other memory and processing resources of the server that are used for executing the multiple processes for the plurality of entities.

3. The method of claim 1, further comprising executing, by the virtual machine, one or more serverless functions.

4. The method of claim 3, wherein the one or more serverless functions comprise Lambda functions.

5. The method of claim 1, wherein the virtual machine runs a host operating system comprising the guest operating system, and wherein the host operating system runs an executable functional code block comprising the one or more cryptographic processes or serverless functions.

6. The method of claim 5, further comprising:
   establishing, by a client device, a communication session with the publicly accessible server via a TCP interface; and
   receiving, from the client device through the communication session, a message directed to the host operating system via a public-key cryptography standard (PKCS) #11 interface, the message comprising a request to encrypt or decrypt data using the cryptographic keys.

7. The method of claim 6, wherein the message is received from the client device via the Internet.

8. The method of claim 6, further comprising:
   generating, by the executable image file, one or more credentials in response to receiving the message; and
   transmitting the one or more credentials to the client device via the PKCS #11 interface.

9. The method of claim 8, wherein the client device is configured to obtain access to a secure resource protected by one or more physical or logical access devices based on the one or more credentials.

10. The method of claim 5, wherein the one or more cryptographic processes are proprietary to the first entity.

11. A system comprising:
    one or more processors configured to perform operations comprising:
      generating, on a publicly accessible server, a secure enclave, the secure enclave having isolated memory and processing resources of the server;
      installing, on the secure enclave, a virtual machine comprising a guest operating system of a first entity;
      installing, by the virtual machine on the guest operating system, one or more cryptographic processes associated with the first entity; and
      encrypting and decrypting cryptographic keys associated with the first entity using the one or more cryptographic processes.

12. The system of claim 11, wherein the publicly accessible server is configured to execute multiple processes for a plurality of entities, wherein the isolated memory and processing resources of the server are exclusively reserved for processes associated with the first entity, and wherein the memory and processing resources are isolated from other memory and processing resources of the server that are used for executing the multiple processes for the plurality of entities.

13. The system of claim 11, the operations further comprising executing, by the virtual machine, one or more serverless functions.

14. The system of claim 13, wherein the one or more serverless functions comprise Lambda functions.

15. The system of claim 11, wherein the virtual machine runs a host operating system comprising the guest operating system, and wherein the host operating system runs an executable functional code block comprising the one or more cryptographic processes.

16. The system of claim 15, the operations further comprising:
   establishing, by a client device, a communication session with the publicly accessible server via a TCP interface; and
   receiving, from the client device through the communication session, a message directed to the host operating system via a public-key cryptography standard (PKCS) #11 interface, the message comprising a request to encrypt or decrypt data using the cryptographic keys.

17. The system of claim 16, wherein the message is received from the client device via the Internet.

18. The system of claim 16, the operations further comprising:
   generating, by the executable image file, one or more credentials in response to receiving the message; and
   transmitting the one or more credentials to the client device via the PKCS #11 interface.

19. The system of claim 18, wherein the client device is configured to obtain access to a secure resource protected by one or more physical or logical access devices based on the one or more credentials.

20. A non-transitory computer-readable medium comprising non-transitory computer-readable instructions that, when executed by one or more processors, configure the one or more processors to perform operations comprising:
   generating, on a publicly accessible server, a secure enclave, the secure enclave having isolated memory and processing resources of the server;
   installing, on the secure enclave, a virtual machine comprising a guest operating system of a first entity;
   installing, by the virtual machine on the guest operating system, one or more cryptographic processes associated with the first entity; and
   encrypting and decrypting cryptographic keys associated with the first entity using the one or more cryptographic processes.

* * * * *